United States Patent
Wu (10) Patent No.: US 12,250,602 B2
(45) Date of Patent: Mar. 11, 2025

(54) METHOD FOR TRANSMITTING FAILURE INFORMATION AND COMMUNICATIONS DEVICE

(71) Applicant: VIVO MOBILE COMMUNICATION CO., LTD., Guangdong (CN)

(72) Inventor: Yumin Wu, Chang'an Dongguan (CN)

(73) Assignee: VIVO COMMUNICATION CO., LTD., Guangdong (CN)

( * ) Notice: Subject to any disclaimer, the term of this patent is extended or adjusted under 35 U.S.C. 154(b) by 366 days.

(21) Appl. No.: 17/841,528

(22) Filed: Jun. 15, 2022

(65) Prior Publication Data

US 2022/0312279 A1    Sep. 29, 2022

Related U.S. Application Data

(63) Continuation of application No. PCT/CN2021/070066, filed on Jan. 4, 2021.

(30) Foreign Application Priority Data

Jan. 6, 2020  (CN) .......................... 202010010709.5

(51) Int. Cl.
*H04W 24/08* (2009.01)
*H04W 24/10* (2009.01)
(Continued)

(52) U.S. Cl.
CPC ....... *H04W 36/0079* (2018.08); *H04W 24/08* (2013.01); *H04W 24/10* (2013.01);
(Continued)

(58) Field of Classification Search
CPC . H04B 7/02–12; H04B 17/0082–3913; H04W 8/22–245; H04W 24/02–10;
(Continued)

(56) References Cited

U.S. PATENT DOCUMENTS

2015/0223282 A1  8/2015  Vajapeyam et al.
2015/0373609 A1  12/2015  Kim et al.
(Continued)

FOREIGN PATENT DOCUMENTS

CN        1852531 A    10/2006
CN     104604279 A     5/2015
(Continued)

OTHER PUBLICATIONS

Qualcomm Incorporated., "RLF handling during MBB HO," 3GPP TSG-RAN WG2 Meeting #105bis, R2-1903652 (Revision of R2-1900366), pp. 1-3, (Apr. 8-12, 2019).
(Continued)

*Primary Examiner* — Timothy J Weidner
(74) *Attorney, Agent, or Firm* — BROOKS KUSHMAN P.C.

(57) ABSTRACT

The present invention provides a method for transmitting failure information and a communications device. The method includes: in a case that failure has occurred on first connection(s) in a dual active protocol stack DAPS mobility procedure, transmitting failure information of at least one of the first connection(s), where the first connection(s) include at least one of the following: a source connection between a terminal and a source cell and a target connection between the terminal and a target cell.

19 Claims, 2 Drawing Sheets

In a case that failure has occurred on first connection(s) in a dual active protocol stack DAPS mobility procedure, transmit failure information of at least one of the first connection(s), where the first connection(s) include at least one of the following: a source connection between a terminal and a source cell and a target connection between the terminal and a target cell. — 201

(51) Int. Cl.
  *H04W 36/00*  (2009.01)
  *H04W 36/18*  (2009.01)
  *H04W 36/30*  (2009.01)
  *H04W 76/15*  (2018.01)
  *H04W 76/18*  (2018.01)
  *H04W 84/02*  (2009.01)
  *H04W 88/02*  (2009.01)
  *H04W 88/08*  (2009.01)
  *H04W 92/02*  (2009.01)
  *H04W 92/10*  (2009.01)

(52) U.S. Cl.
  CPC ... *H04W 36/0058* (2018.08); *H04W 36/0085* (2018.08); *H04W 36/185* (2023.05); *H04W 36/305* (2018.08); *H04W 76/15* (2018.02); *H04W 76/18* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC .......... H04W 28/02–26; H04W 36/0005–385; H04W 40/005–38; H04W 48/02–20; H04W 56/0005–0095; H04W 60/005–06; H04W 74/002–008; H04W 76/10–50; H04W 84/02–16; H04W 88/02–12; H04W 92/02–04; H04W 92/10
  See application file for complete search history.

(56) References Cited

U.S. PATENT DOCUMENTS

| | | | |
|---|---|---|---|
| 2017/0150294 A1 | 5/2017 | Wang et al. | |
| 2018/0124850 A1 | 5/2018 | Wu | |
| 2019/0215756 A1 | 7/2019 | Park et al. | |
| 2020/0015142 A1 | 1/2020 | Jia et al. | |
| 2020/0314716 A1* | 10/2020 | Kim | H04W 36/0058 |
| 2022/0264414 A1* | 8/2022 | Hu | H04W 36/0061 |
| 2022/0386204 A1* | 12/2022 | Parichehrehteroujeni | H04W 36/0079 |

FOREIGN PATENT DOCUMENTS

| | | |
|---|---|---|
| CN | 107690162 A | 2/2018 |
| CN | 107708160 A | 2/2018 |
| CN | 110402592 A | 11/2019 |
| JP | 2017-507578 A | 3/2017 |

OTHER PUBLICATIONS

Vivo., "Discussion on the RLF and HOF for DAPS," 3GPP TSG-RAN WG2 Meeting #107, R2-1909775 (Revision of R2-1905975), pp. 1-8, (Aug. 26-30, 2019).

Vivo., "Summary of Email Discussion on CP for DAPS," 3GPP TSG-RAN WG2 Meeting #107bis, R2-1912349, pp. 1-37, (Oct. 14-18, 2019).

Extended European Search Report dated Apr. 17, 2023 as received in Application No. 21738321.5.

JP Office Action dated Apr. 25, 2023 as received in Application No. 2022-541782.

RAN2., "NR Mobility Enhancements," 3GPP TSG RAN Meeting #86, RP-192533, pp. 1-36, (Dec. 9-12, 2019).

JP Office Action dated Aug. 8, 2023 as received in Application No. 2022-541782.

CN Office Action in Application No. 202010010709.5 Dated Aug. 11, 2022.

"DraftCR for introducing the fallback to source cell in DAPS handover failure" 3GPP TSG-RAN WG2 Meeting #108, Nokia, Nokia Shanghai Bell, R2-1915502, Nov. 18, 2019.

Written Opinion and International Search Report in Application No. PCT/CN2021/070066 Dated Mar. 30, 2021.

First Office Action for Korean Application No. 10-2022-7020876, dated Oct. 17, 2024, 6 Pages.

Vivo "SRB handling of DAPS failure" 3GPP TSG-RAN WG2 Meeting #108, Reno, USA, Nov. 2019, R2-1914706, 2 Pages.

Nokia, Nokia Shanghai Bell "On RLF reporting for CHO and Daps" 3GPP TSG-RAN WG2 Meeting #108, Reno, USA, Nov. 2019, R2-1915497, 3 Pages.

* cited by examiner

FIG. 1

In a case that failure has occurred on first connection(s) in a dual active protocol stack DAPS mobility procedure, transmit failure information of at least one of the first connection(s), where the first connection(s) include at least one of the following: a source connection between a terminal and a source cell and a target connection between the terminal and a target cell. — 201

METHOD FOR TRANSMITTING FAILURE INFORMATION AND COMMUNICATIONS DEVICE

CROSS-REFERENCE TO RELATED APPLICATIONS

This application is a continuation application of PCT International Application No. PCT/CN2021/070066 filed on Jan. 4, 2021, which claims a priority to Chinese Patent Application No. 202010010709.5, filed in China on Jan. 6, 2020, which is incorporated herein by reference in its entirety.

TECHNICAL FIELD

Embodiments of the present invention relate to the field of communications technologies, and in particular, to a method for transmitting failure information and a communications device.

BACKGROUND

In a dual active protocol stack (DAPS) mobility procedure, a terminal can establish both a connection with a source cell and a connection with a target cell. Then, the terminal can release the connection with the source cell and maintain only the connection with the target cell.

During the DAPS mobility procedure, the terminal may experience source connection failure, target connection failure, or both source and target connection failure. At present, when a terminal experiences connection failure, no corresponding solution is yet available for reporting relevant information of the connection failure.

SUMMARY

Embodiments of the present invention provide a method for transmitting failure information and a communications device.

According to a first aspect, an embodiment of the present invention provides a method for transmitting failure information, applied to a communications device. The method includes:
  in a case that failure has occurred on first connection(s) in a dual active protocol stack DAPS mobility procedure, transmitting failure information of at least one of the first connection(s), where
  the first connection(s) include at least one of the following: a source connection between a terminal and a source cell and a target connection between the terminal and a target cell.

According to a second aspect, an embodiment of the present invention further provides a communications device. The communications device includes:
  a first transmission module, configured to: in a case that failure has occurred on first connection(s) in a dual active protocol stack DAPS mobility procedure, transmit failure information of at least one of the first connection(s), where
  the first connection(s) include at least one of the following: a source connection between a terminal and a source cell and a target connection between the terminal and a target cell.

According to a third aspect, an embodiment of the present invention further provides a communications device. The communications device includes a processor, a memory, and a computer program stored in the memory and capable of running on the processor. When the computer program is executed by the processor, the steps of the foregoing method for transmitting failure information are implemented.

According to a fourth aspect, an embodiment of the present invention further provides a computer-readable storage medium. The computer-readable storage medium stores a computer program, and when the computer program is executed by a processor, the steps of the foregoing method for transmitting failure information are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The terms "first", "second", and the like in the present invention are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device.

The method for transmitting failure information in the embodiments of the present invention can be applied to a communications device. Specifically, the communications device may be a terminal or a network side device.

In practical application, a terminal and a network side device can communicate with each other to transmit information. It should be understood that "transmission" in the embodiments of the present invention may be understood as "sending" or "receiving", and actual meaning of "transmission" can be determined based on an actual situation.

In the embodiments of the present invention, the terminal may also be referred to as user equipment (UE). In practical applications, the terminal may be a mobile phone, a tablet personal computer, a laptop computer, a personal digital assistant (PDA), a mobile Internet device (MID), a wearable device, an in-vehicle device, or the like. The network side device may be a base station, a relay, an access point, or the like.

For ease of understanding, the following describes some content involved in the embodiments of the present invention.

1. Dual active protocol stack (DAPS) mobility procedure

In practical applications, procedures such as handover, secondary cell group (SCG) change, and SCG addition can be considered as DAPS mobility procedures.

Figure 1:
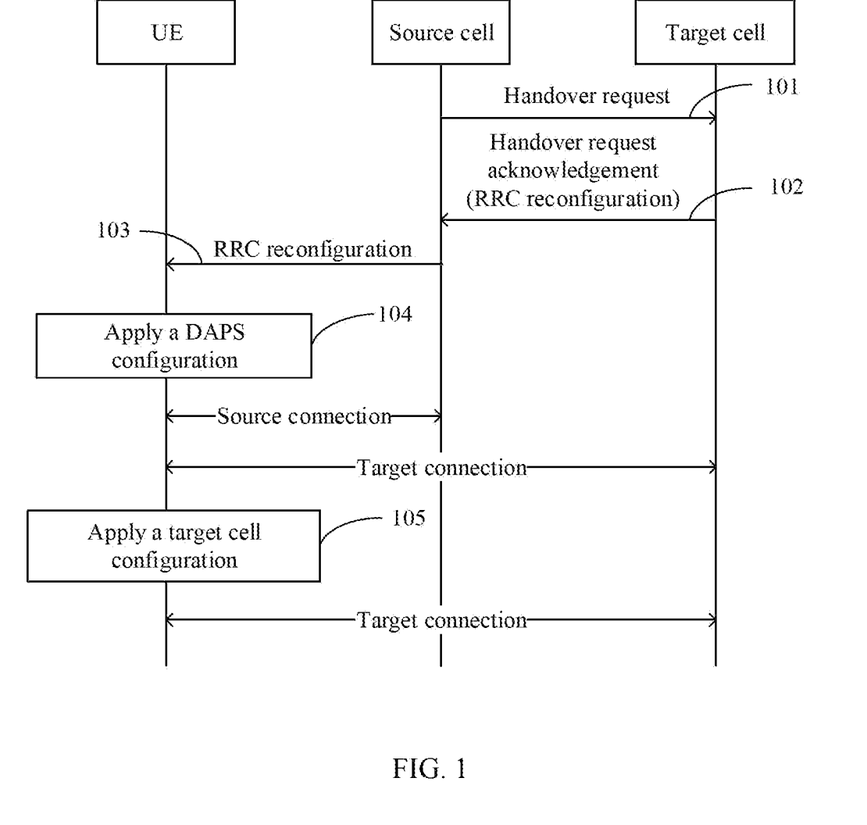
FIG. 1 is a schematic diagram of a DAPS mobility procedure to which an embodiment of the present invention can be applied.

In FIG. 1, a handover procedure is used to describe a DAPS mobility procedure.

As shown in FIG. 1, the DAPS mobility procedure may include the following steps:

Step 101. A source cell sends a handover request to a target cell.

Step 102. The target cell sends a handover request acknowledgement to the source cell, where the handover request acknowledgement carries radio resource control (RRC) reconfiguration information.

Step 103. The target cell sends the RRC Reconfiguration information to UE.

Step 104. The UE applies a DAPS configuration (Apply DAPS Configuration) to establish a source connection with the source cell and a target connection with the target cell.

Step 105. The UE applies a target cell configuration (Apply Target Configuration) to release the source connection and maintain the target connection.

In the DAPS mobility procedure, the UE can establish both a connection with the source cell and a connection with the target cell, as shown in Step 104 in FIG. 1. Then, the UE can release the connection with the source cell and maintain only the connection with the target cell, as shown in Step 105 in FIG. 1.

The UE may start a timer (for example, T304) when starting to perform the DAPS mobility procedure. The UE stops the timer when a connection with the target cell is successfully established (for example, random access is successfully completed). If the timer expires and the UE fails to establish a connection with the target cell, the UE can determine that handover failure has occurred.

2. Dual connectivity (DC)

A DC architecture may include two cell groups: a master cell group (MCG) and an SCG. The MCG includes at least one primary cell (PCell) and at least one secondary cell (SCell). The SCG includes at least one primary secondary cell (PSCell) and at least one SCell. The PCell(s) and PSCell(s) can be collectively referred to as special cells (SpCell). For the DC architecture, the UE can initiate a random access procedure in both the MCG and the SCG.

The following describes the method for transmitting failure information in the embodiments of the present invention.

Figure 2:
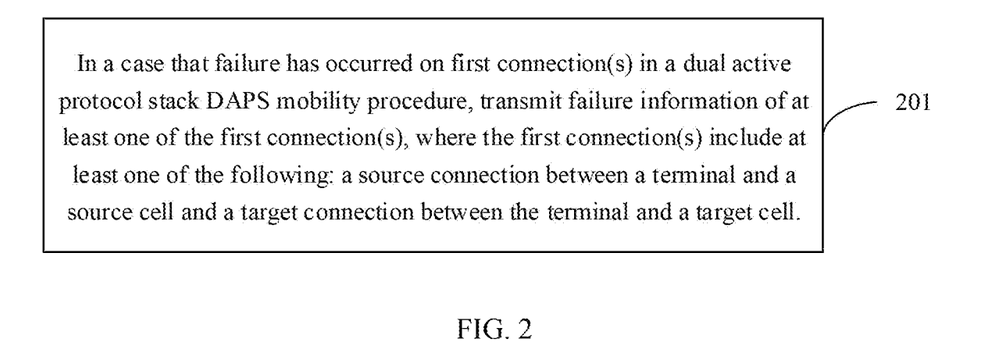
FIG. 2 is a flowchart of a method for transmitting failure information according to an embodiment of the present invention.

FIG. 2 is a flowchart of a method for transmitting failure information according to an embodiment of the present invention. The method for transmitting failure information in this embodiment of the present invention is applied to a communications device. As shown in FIG. 2, the method for transmitting failure information may include the following steps.

Step 201. In a case that failure has occurred on first connection(s) in a dual active protocol stack DAPS mobility procedure, transmit failure information of at least one of the first connection(s), where the first connection(s) include at least one of the following: a source connection between a terminal and a source cell and a target connection between the terminal and a target cell.

In this embodiment of the present invention, in a case that the communications device is a terminal, the transmitting failure information of at least one of the first connection(s) may specifically be: sending failure information of at least one of the first connection(s). In a case that the communications device is a network side device, the transmitting failure information of at least one of the first connection(s) may specifically be: receiving failure information of at least one of the first connection(s). That is, in this embodiment of the present invention, the failure information is sent by the terminal to the network side device.

In a specific implementation, if failure has occurred on the first connection(s) of the terminal in the dual active protocol stack DAPS mobility procedure, failure information of the first connection(s) may be recorded in one implementation, and the failure information of the at least one of the first connection(s) may be recorded in another implementation. Thereafter, the failure information of the at least one of the first connection(s) is reported to the network side device. In this way, the network side device can optimize connection configuration information based on the received failure information, thereby improving connection reliability.

In this embodiment of the present invention, the terminal may send the failure information in the following two manners:

Manner 1. The terminal may actively trigger sending of the failure information; and Manner 2. The terminal may trigger sending of the failure information based on a request from the network side device.

For manner 1, in a case of connection failure, the terminal can spontaneously report the recorded failure information to the network side device without a request from the network side device.

For manner 2, optionally, before the transmitting failure information of at least one of the first connection(s), the method further includes: transmitting request information, where the request information is used to request the terminal to report the failure information.

In a case that the communications device is a terminal, the transmitting request information may specifically be receiving the request information. In a case that the communications device is a network side device, the transmitting request information may specifically be sending the request information. That is, in this embodiment of the present invention, the request information is sent by the network side device to the terminal.

In a specific implementation, in a case of connection failure, the terminal may check whether the request information from the network side device has been received, and may report the recorded failure information to the network side device in a case that the request information has been received, or otherwise may not report the recorded failure information.

In practical applications, this embodiment may include the following implementations:

Implementation 1: In a case that the source connection fails in the DAPS mobility procedure, failure information of the source connection is transmitted;

Implementation 2: In a case that the target connection fails in the DAPS mobility procedure, failure information of the target connection is transmitted;

Implementation 3: In a case that both the source connection and the target connection fail in the DAPS mobility procedure, failure information of the source connection is transmitted;

Implementation 4: In a case that both the source connection and the target connection fail in the DAPS mobility procedure, failure information of the target connection is transmitted; and Implementation 5: In a case that both the source connection and the target connection fail in the DAPS mobility procedure, failure information of the source connection and the target connection is transmitted.

It can be learned from the foregoing content that in a case that both the source connection and the target connection fail in the DAPS mobility procedure, three implementations are available for the terminal: specifically, the Implementations 3 to 5. In practical applications, the terminal may select one from the three implementations to implement. For Manner 1 and Manner 2, a specific implementation may be selected in a different way. The details are as follows.

For Manner 1, the terminal may autonomously select one from the three implementations for execution.

Optionally, the terminal may select a specific implementation based on the recorded failure information. For example, if the terminal records only the failure information of the source connection, Implementation 3 may be executed. If the terminal records the failure information of the source connection and the target connection, Implementation 5 may be executed.

Optionally, the terminal may select a specific implementation based on a failure count of each type of connection within a preset duration. For example, if the terminal detects that a failure count of the target connection is more than a failure count of the source connection within the preset duration, the terminal may select Implementation 4 for execution.

For Manner 2, the terminal may determine to select one of the three implementations for execution based on the request information sent by the network side device. Details are as follows.

In a case that the request information sent by the network side device requests the terminal to send the failure information of the source connection, the terminal executes Implementation 3. In a case that the request information sent by the network side device requests the terminal to send the failure information of the target connection, the terminal executes Implementation 4. In a case that the request information sent by the network side device requests the terminal to send the failure information of the source connection and the target connection, the terminal executes Implementation 5.

It can be learned that compared with Manner 2, in Manner 1, the terminal has more flexibility in selection, and that compared with Manner 1, in Manner 2, the failure information reported by the terminal is more desirable for the network side device, thereby improving utilization of the failure information.

In addition, in this embodiment of the present invention, optionally, before the transmitting failure information of at least one of the first connection(s), the method further includes:

transmitting seventh indication information for indicating that the terminal has stored the failure information.

In a case that the communications device is a terminal, the transmitting seventh indication information may specifically be sending the seventh indication information. In a case that the communications device is a network side device, the transmitting seventh indication information may specifically be receiving the seventh indication information. That is, in this embodiment of the present invention, the seventh indication information is sent by the terminal to the network side device.

In a specific implementation, after recording the failure information, the terminal may send the seventh indication information to the network side device, to indicate that the terminal has stored the failure information. Thereafter, the failure information may be reported to the network side device according to Manner 1 or Manner 2.

In the method for transmitting failure information of this embodiment, in a case that failure has occurred on the first connection(s) in the dual active protocol stack DAPS mobility procedure, the failure information of the at least one of the first connection(s) is transmitted, where the first connection(s) include at least one of the following: the source connection between the terminal and the source cell and the target connection between the terminal and the target cell. This resolves the problem of reporting connection failure information when connection failure occurs in a DAPS mobility procedure. Further, the terminal can help a network side device to optimize a connection configuration by reporting the failure information, thereby improving connection reliability.

The following describes the failure information in this embodiment of the present invention.

First, it should be noted that in this embodiment of the present invention, connection(s) corresponding to the failure information may be understood as the at least one of the first connection(s). Examples are described below:

In a case that the first connection(s) are the source connection (or the target connection), there is one first connection. It is easy to understand that the at least one connection is the same as the first connection(s). Therefore, the connection(s) corresponding to the failure information are the source connection (or the target connection).

In a case that the first connection(s) are the source connection and the target connection, the first connection(s) include two connections, and there may be three patterns for the at least one connection.

Pattern 1: The at least one connection includes only the source connection.

Pattern 2: The at least one connection includes only the target connection.

Pattern 3: The at least one connection includes the source connection and the target connection.

For the at least one connection in Pattern 1, the connection(s) corresponding to the failure information are the source connection. For the at least one connection in Pattern 2, the connection(s) corresponding to the failure information are the target connection. For the at least one connection in Pattern 3, the connection(s) corresponding to the failure information include the source connection and the target connection.

In this embodiment of the present invention, there may be two representations for the failure information. Details are as follows:

Representation 1: The failure information includes at least one of the following: fourth indication information for indicating a failure type of a connection corresponding to the failure information, and measurement information.

Representation 2: The failure information includes at least one of the following: fifth indication information for indicating that the terminal has experienced source connection failure and target connection failure; sixth indication information for indicating failure type(s) of at least one of the source connection and the target connection; and measurement information.

For the measurement information in Representation 1 and Representation 2 in a specific implementation, optionally, the measurement information includes at least one of the following: source cell measurement result, target cell measurement result, and neighboring cell measurement result, where the source cell is a primary cell PCell or a secondary cell SCell, and the target cell is a PCell or a SCell.

The following describes application scenarios of the failure information of these two representations.

Scenario 1: Optionally, in a case that a first condition is satisfied, the failure information is information of Representation 1. That is, the failure information includes at least one of the following: fourth indication information for indicating a failure type of a connection corresponding to the failure information, and measurement information.

That the first condition is satisfied includes any one of the following:
  that the first connection is the source connection or the target connection; and
  that the first connection(s) include the source connection and the target connection and that a connection corresponding to the failure information is the source connection or the target connection.

In Scenario 1, there are different cases for the failure type indicated by the fourth indication information in different situations. Details are as follows.

Case 1: In a case that a second condition is satisfied, the failure type of the connection corresponding to the failure information includes any one of the following: radio link failure, integrity check failure, radio resource control RRC message reconfiguration failure, and maximum uplink transmission timing difference exceeded, where
  that the second condition is satisfied includes any one of the following:
  that the connection corresponding to the failure information is the source connection; and
  that the connection corresponding to the failure information is the target connection and that the connection corresponding to the failure information fails after the terminal is connected to the target cell.

In a specific implementation, that the second condition is satisfied includes that the connection corresponding to the failure information is the source connection, which may correspond to Implementation 1 and Implementation 3. That is, for Implementation 1 and Implementation 3, the failure type indicated by the fourth indication information may include any one of the following: radio link failure, integrity check failure, radio resource control RRC message reconfiguration failure, and maximum uplink transmission timing difference exceeded.

That the second condition is satisfied includes that the connection corresponding to the failure information is the target connection and that the connection corresponding to the failure information fails after the terminal is connected to the target cell, which may correspond to Implementation 2 and Implementation 4. That is, for Implementation 2 and Implementation 4, the failure type indicated by the fourth indication information may include any one of the following: radio link failure, integrity check failure, radio resource control RRC message reconfiguration failure, and maximum uplink transmission timing difference exceeded.

Case 2: In a case that the connection corresponding to the failure information is the target connection and that the connection corresponding to the failure information fails before the terminal is connected to the target cell, the failure type of the connection corresponding to the failure information includes any one of the following: handover failure, secondary cell group SCG addition failure, radio link failure, integrity check failure, RRC message reconfiguration failure, and maximum uplink transmission timing difference exceeded.

In specific implementation, Case 2 may be applicable to Implementation 2 and Implementation 4. That is, for Implementation 2 and Implementation 4, the failure type indicated by the fourth indication information may include any one of the following: handover failure, secondary cell group SCG addition failure, radio link failure, integrity check failure, RRC message reconfiguration failure, and maximum uplink transmission timing difference exceeded.

Scenario 2: In a case that the first connection(s) include the source connection and the target connection and that connections corresponding to the failure information include the source connection and the target connection, the failure information is information of Representation 2, that is, the failure information includes at least one of the following:
  fifth indication information for indicating that the terminal has experienced source connection failure and target connection failure;
  sixth indication information for indicating failure type(s) of at least one of the source connection and the target connection; and
  measurement information.

In a specific implementation, that the first connection(s) include the source connection and the target connection and that connections corresponding to the failure information include the source connection and the target connection corresponds to Implementation 5. That is, for Implementation 5, the failure information may be Pattern 2.

In Scenario 2, further, the sixth indication information satisfies any one of the following:
  in a case that the sixth indication information is used to indicate the failure type of the source connection or the target connection, a connection corresponding to the sixth indication information is prescribed by a protocol or configured by a network side device; and
  in a case that the sixth indication information is used to indicate the failure types of the source connection and the target connection, the sixth indication information is further used to indicate a connection corresponding to each failure type.

In this way, the network side device can learn about a type of a connection corresponding to each failure type indicated by the sixth indication information, and hence can optimize each type of connection configuration based on a failure type of this type of connection, thereby improving connection reliability.

Further, the failure type(s) indicated by the sixth indication information satisfy at least one of the following:
  in a case that the connection corresponding to the sixth indication information fails before the terminal is connected to the target cell, the failure type(s) indicated by the sixth indication information include at least one of the following: handover failure, SCG addition failure, radio link failure, integrity check failure, RRC message reconfiguration failure, and maximum uplink transmission timing difference exceeded; and
  in a case that the connection corresponding to the sixth indication information fails after the terminal is connected to the target cell, the failure type(s) indicated by the sixth indication information include at least one of the following: radio link failure, integrity check failure, RRC message reconfiguration failure, and maximum uplink transmission timing difference exceeded.

In this embodiment of the present invention, the handover failure may include that a timer T304 expires. The timer is started when the UE receives a handover command. However, the handover failure is not limited thereto.

The SCG addition failure may be SCG addition failure in an SCG addition procedure, or SCG addition failure in an SCG change procedure. The SCG addition failure may include that a timer T307 expires. The timer is started when the UE receives an SCG addition or change command. However, the SCG addition failure is not limited thereto.

Optionally, the radio link failure may include at least one of the following:
physical layer out of synchronization (for example, timer T310 expiry);
MAC layer random access failure (for example, reaching the maximum number of random access attempts);
indication information indicating that the maximum number of retransmissions at RLC layer is reached (for example, the maximum number of RLC layer retransmissions is reached); and
beam failure (for example, failure of a beam recovery procedure).

The maximum uplink transmission timing difference may be a difference between boundaries of subframes for uplink transmission for the MCG and the SCG when the network side device configures synchronous DC, but is not limited thereto.

It can be learned from the foregoing content that for three cases of the terminal: source connection failure, target connection failure, and source connection failure and target connection failure, the indicated failure types may all include maximum uplink transmission timing difference exceeded. In practical applications, the terminal may determine a type of a failed connection in the following ways.

Optionally, if an uplink transmission timing difference between the source connection and the target connection of the UE exceeds a maximum uplink transmission timing difference, and the UE stops data transmission over the source connection, it may be determined that the source connection has failed.

If an uplink transmission timing difference between the source connection and the target connection of the UE exceeds a maximum uplink transmission timing difference, and the UE stops data transmission over the target connection, it may be determined that the target connection has failed.

If an uplink transmission timing difference between the source connection and the target connection of the UE exceeds a maximum uplink transmission timing difference, and the UE stops data transmission over the source connection and the target connection, it may be determined that the source connection and the target connection have failed.

It can be learned from the foregoing content that for Implementation 1 to Implementation 5, failure types indicated by the failure information may be the same. Therefore, the terminal may use other indication information to distinguish between Implementation 1 to Implementation 5. Details are as follows.

Optionally, in a case that the first connection(s) are the source connection or the target connection, the failure information satisfies any one of the following:
that the failure information includes first indication information for indicating a connection corresponding to the failure information; and
that the failure information is transmitted over a target resource, where the target resource is a resource corresponding to a second connection, and the second connection is a connection other than the connection corresponding to the failure information in the first connection(s).

Details are as follows.

First case: The failure information includes first indication information.

In a case that the first connection(s) are the source connection, the connection corresponding to the failure information is the source connection. Therefore, in this case, the first indication information indicates that the connection corresponding to the failure information is the source connection. That is, the failure information is failure information of the source connection. In this way, upon receiving the failure information, the network side device can know that the terminal has experienced source connection failure.

In a case that the first connection(s) are the target connection, the connection corresponding to the failure information is the target connection. Therefore, in this case, the first indication information indicates that the connection corresponding to the failure information is the target connection. That is, the failure information is failure information of the target connection. In this way, after receiving the failure information, the network side device can know that the terminal has experienced target connection failure.

It can be learned that in the First case, the terminal may explicitly indicate the connection corresponding to the failure information by carrying the first indication information in the failure information, thereby helping the network side device to accurately distinguish between source connection failure of the terminal and target connection failure of the terminal, and determine which one is executed by the terminal: Implementation 1 or Implementation 2.

Second case: The failure information is transmitted over the target resource.

In a case that the first connection(s) are the source connection, the connection corresponding to the failure information is the source connection, and the target resource is the target connection. In this case, the failure information is transmitted over a resource corresponding to the target connection. In this way, the network side device can know that the target connection of the terminal has not failed by using the received resource for the failure information, and further know that the failure information is the failure information of the source connection and that the terminal has experienced source connection failure.

In a case that the first connection(s) are the target connection, the connection corresponding to the failure information is the target connection, and the target resource is the source connection. In this case, the failure information is transmitted over a resource corresponding to the source connection. In this way, the network side device can know that the source connection of the terminal has not failed by using the received resource for the failure information, and further know that the failure information is the failure information of the target connection and that the terminal has experienced target connection failure.

It can be learned that in the Second case, the terminal can implicitly indicate a type of a failed connection of the terminal by transmitting the failure information over a resource corresponding to an unfailed connection, thereby helping the network side device to accurately distinguish between source connection failure of the terminal and target connection failure of the terminal, and determine which one is executed by the terminal: Implementation 1 or Implementation 2.

Compared with the Second case 2, in the First case 1, the first indication information can explicitly indicate the connection corresponding to the failure information. In this way, the network side device can know connection corresponding to the information upon obtaining the first indication information, thereby improving efficiency in determining the connection corresponding to the failure information.

Compared with the First case 1, in the Second case 2, the connection corresponding to the failure information can be implicitly indicated by using the resource for transmitting the failure information instead of carrying the first indication information, thereby reducing signaling overheads.

Optionally, in a case that the first connection(s) include the source connection and the target connection and that a connection corresponding to the failure information is the source connection or the target connection, the method further includes:
transmitting second indication information for indicating that the terminal has experienced source connection failure and target connection failure.

In a case that the communications device is a terminal, the transmitting second indication information may specifically be sending the second indication information. In a case that the communications device is a network side device, the transmitting second indication information may specifically be receiving the second indication information. That is, in this embodiment of the present invention, the second indication information is sent by a terminal to a network side device.

In a specific implementation, the terminal may integrate the second indication information and the failure information into one message and send the message to the network side device, but is not limited thereto.

In this way, in a case that the network side device has received the failure information and the second indication information, even if the connection corresponding to the failure information is the source connection or the target connection, the network side device can know that the terminal has experienced source connection failure and target connection failure, then distinguish between a case in which the terminal has experienced source connection failure and target connection failure, but reported only the failure information of the source connection or the target connection and a case in which the terminal has experienced source connection failure (target connection failure) and reported the failure information of the source connection (or the target connection), and determine which one the terminal has performed: Implementation 1 or Implementation 3, or which one the terminal has performed: Implementation 2 or Implementation 4.

Further, in a case that the first connection(s) include the source connection and the target connection and that a connection corresponding to the failure information is the source connection or the target connection, the connection corresponding to the failure information is prescribed by a protocol or configured by a network side device. That is, in a case of source connection failure and target connection failure, the terminal may report the failure information of only one of the source connection and the target connection according to the protocol prescription or the network side configuration.

It should be noted that it can be learned from the foregoing content that the network side device may send request information to request the terminal to send the connection failure information. Therefore, for a scenario in which the connection corresponding to the failure information is configured by the network side device, optionally, the network side device may indicate the connection corresponding to the failure information by using the request information.

For example, it is assumed that the terminal experiences source connection failure and target connection failure, records the failure information of the source connection and the target connection, and then sends the seventh indication information to the network side device, to indicate that the terminal has stored the failure information of the source connection and the target connection. In this way, upon receiving the seventh indication information, the network side device knows that the terminal has experienced source connection failure and target connection failure. However, it is assumed that the network side device is only concerned with failure of the target connection. In this case, the network side device can send request information to the terminal, to request the terminal to send the failure information of the target connection. In this way, after receiving the request information, the terminal can report only the failure information of the target connection.

In practical applications, the first connection(s) may fail before or after the completion of the terminal handover, that is, before or after random access to the target connection is successfully completed. It can be learned from the foregoing content that for failure that occurs at different times, failure types indicated by failure information may be the same. Therefore, to enable the network side device to accurately know the time when the connection corresponding to the failure information fails, optionally, the failure information includes third indication information for indicating any one of the following:
that a connection corresponding to the failure information fails before the terminal is connected to the target cell; and
that a connection corresponding to the failure information fails after the terminal is connected to the target cell.

In this way, upon receiving the third indication information, the network side device can know the time when the connection corresponding to the failure information fails, and then determines a failure handling strategy based on the time, thereby improving reliability of failure handling.

In this embodiment of the present invention, optionally, the method further includes:
transmitting failure timing duration(s) of at least one of the first connection(s) in a case that a third condition is satisfied, where a failure timing duration of each connection starts from a first time point to a time point when the connection fails, where
that the third condition is satisfied includes any one of the following:
that in a case that N connections of the terminal have failed, the terminal is allowed to report failure timing durations of M of the N connections; and
that in a case that N connections of the terminal have failed, the terminal is allowed to report failure timing duration(s) of connection(s) of a target type in the N connections, and that the first connection(s) include connection(s) of the target type, where
N is a positive integer, and M is a positive integer less than or equal to N.

In a case that the communications device is a terminal, the transmitting failure timing duration(s) of at least one of the first connection(s) may be specifically understood as sending failure timing duration(s) of at least one of the first connection(s). In a case that the communications device is a network side device, the transmitting failure timing duration(s) of at least one of the first connection(s) may be specifically understood as receiving failure timing duration(s) of at least one of the first connection(s). That is, the failure timing duration(s) are sent by the terminal to the network side device.

It should be noted that the understanding of the connection(s) corresponding to the failure timing duration(s) is the same as the understanding of the connection(s) corresponding to the failure information. For example, if a failure timing duration of the source connection is transmitted, a connection corresponding to the failure timing duration is the source connection.

In addition, in this embodiment of the present invention, the connection(s) corresponding to the failure timing duration(s) and the connection corresponding to the failure information may be the same or different.

For example, in a case that the terminal has experienced source connection failure and target connection failure, in one implementation, the terminal may upload the failure information of the target connection and the failure timing duration of the target connection. In another implementation, the terminal may upload the failure information of the source connection and the failure timing duration of the target connection.

Further, connection(s) corresponding to the transmitted failure timing duration(s) satisfy any one of the following:
that in a case that the third condition being satisfied includes the terminal being allowed to report failure timing durations of M of the N connections, the connection(s) corresponding to the transmitted failure timing duration(s) include all of the first connection(s); and
that in a case that the third condition being satisfied includes the terminal being allowed to report failure timing duration(s) of connection(s) of a target type in the N connections and that the first connection(s) include connection(s) of the target type, the connection(s) corresponding to the transmitted failure timing duration(s) include the connection(s) of the target type in the first connection(s).

It should be noted that in a case that the third condition being satisfied includes the terminal being allowed to report failure timing durations of M of the N connections, that the connection(s) corresponding to the transmitted failure timing duration(s) includes all of the first connection(s) may correspond to a case that M is equal to N. In a case that M is less than N, the connection(s) corresponding to the transmitted failure timing duration(s) may include only some of the first connection(s).

In a specific implementation, the terminal may determine a method for reporting the failure timing duration(s). The following two reporting methods may be included.

Reporting method 1: In a case that N connections of the terminal have failed, the terminal is allowed to report failure timing durations of M of the N connections.

Reporting method 2: Ina case that N connections of the terminal have failed, the terminal is allowed to report failure timing duration(s) of connection(s) of a target type in the N connections, where the connection of the target type may be the source connection or the target connection.

In practical applications, the reporting method may be predetermined by a protocol or configured by a network side device.

After determining the reporting method, the terminal may determine the connection(s) corresponding to the failure timing duration(s)

For ease of understanding, an example is described as follows:

It is assumed that the terminal has experienced source connection failure and target connection failure.

Implementation 1. It is assumed that a reporting method determined by the terminal is Reporting method 1 and that M is 1. The terminal may choose to report the failure timing duration of the source connection or the failure timing duration of the target connection.

Implementation 2: It is assumed that a reporting method determined by the terminal is Reporting method 2 and that the connection of the target type is the source connection. The terminal may report only the failure timing duration of the source connection.

It can be learned that compared with the Reporting method 2, the Reporting method 1 is more flexible in reporting a failure timing duration.

Optionally, the first time point is any one of the following:
a time point when the terminal receives a first command, where the first command instructs the terminal to perform a DAPS mobility procedure; and
a time point when the terminal starts to perform a DAPS mobility procedure.

After receiving the failure timing duration(s), the network side device may optimize a connection configuration based on the failure timing duration(s). For example, it is assumed that the network side device has received the failure timing duration of the source connection. If the failure timing duration of the source connection is short, it means that the first command is delivered too late. Therefore, a time to deliver the first command can be advanced. It is assumed that the network side device has received the failure timing duration of the target connection. If the failure timing duration of the target connection is short, it means that the first command is delivered too early. Therefore, a time to deliver the first command can be postponed. In this way, connection reliability can be improved.

It should be noted that various optional implementations described in this embodiment of the present invention may be implemented in combination or may be implemented separately. This is not limited in this embodiment of the present invention.

For ease of understanding, an example is described as follows:

Step 1 UE receives DAPS mobility procedure configuration information (for example, a DAPS handover command) from a network side.

Step 2. The UE executes the DAPS mobility procedure.

If the UE sends connection failure during execution of the DAPS mobility procedure, the UE records failure information of a connection.

Step 3. After the UE establishes a connection with the network side (for example, after handover is completed or after a connection is reestablished), the UE reports, spontaneously or according to request information of the network side, the connection failure information generated in the DAPS mobility procedure to the network side.

Content reported in connection failure information includes at least one of the following:

Event 1: Before a random access procedure for connecting to a target connection is successfully completed (or before handover is completed), if a source connection fails, failure information of the source connection is reported.

Event 2: Before a random access procedure for connecting to a target connection is successfully completed (or before handover is completed), if the target connection fails, failure information of the target connection is reported.

Event 3: Before a random access procedure for connecting to a target connection is successfully completed (or before handover is completed), if both a source connection and the target connection fail, failure information of the source connection and/or the target connection is reported.

Event 4: After a random access procedure for connecting to a target connection is successfully completed (or after handover is completed) and before a source connection is released, if the source connection fails, failure information of the source connection is reported.

Event 5: After a random access procedure for connecting to a target connection is successfully completed (or after handover is completed) and before a source connection is released, if the target connection fails, failure information of the target connection is reported.

Event 6: After a random access procedure for connecting to a target connection is successfully completed (or after handover is completed) and before a source connection is released, if both a source connection and the target connection fail, failure information of the source connection and/or the target connection is reported.

For Event 1, the failure information of the source connection includes at least one of the following:
  failure type indication information of Event 1; and
  measurement information.

The "failure type indication information of Event 1" includes any one of the following:
  radio link failure;
  integrity check failure;
  RRC message reconfiguration failure; and
  maximum uplink transmission timing difference exceeded (for example, a maximum uplink transmission timing difference between the source connection and the target connection of the UE exceeds a maximum timing difference, and the UE stops data transmission over the source connection).

The "radio link failure indication information" can further include any of the following:
  physical layer out of synchronization;
  MAC layer random access failure;
  an indication indicating that the maximum number of retransmissions at RLC layer is reached; and
  beam failure.

The "measurement information" includes at least one of the following:
  a measurement result of a PCell for the source connection;
  a measurement result of a PCell for the target connection;
  a measurement result of an SCell for the source connection:
  a measurement result of an SCell for the target connection; and
  a measurement result of a neighboring cell.

For Event 2, the failure information of the target connection includes at least one of the following:
  failure type indication information of Event 2; and
  measurement information.

The "failure type indication information of Event 2" includes any one of the following:
  handover failure in a handover procedure;
  SCG addition failure in an SCG change or addition procedure;
  radio link failure;
  integrity check failure;
  RRC message reconfiguration failure; and
  maximum uplink transmission timing difference exceeded (for example, a maximum uplink transmission timing difference between the source connection and the target connection of the UE exceeds a maximum timing difference, and the UE stops data transmission over the target connection).

The "radio link failure" indication information can further include any of the following:
  physical layer out of synchronization;
  MAC layer random access failure;
  an indication indicating that the maximum number of retransmissions at RLC layer is reached; and
  beam failure.

The "measurement information" is the same as that in Event 1.

For Event 3, the failure information includes at least one of the following:
  failure information of the source connection (same as Event 1);
  failure information of the target connection (same as Event 2); and
  information that both the source connection and the target connection fail.

The "information that both the source connection and the target connection fail" includes at least one of the following:
  an indication indicating that both the source connection and the target connection fail;
  an indication indicating failure types of both source connection failure and target connection failure; and
  measurement information.

The "indication indicating failure types of both source connection failure and target connection failure" includes at least one of the following:
  handover failure in a handover procedure;
  SCG addition failure in an SCG change or addition procedure;
  radio link failure;
  integrity check failure;
  RRC message reconfiguration failure; and
  maximum uplink transmission timing difference exceeded (for example, a maximum uplink transmission timing difference between the source connection and the target connection of the UE exceeds a maximum timing difference, and the UE stops data transmission over the source connection and the target connection).

The "indication indicating failure types of both source connection failure and target connection failure" may be determined by the failure type of the source connection or the failure type of the target connection according to protocol prescription or a network side indication. For example, if the source connection experiences radio link failure and the target connection experiences handover failure, the UE may report the failure type (that is, handover failure) of the target connection according to protocol prescription.

The "measurement information" is the same as that in Event 1.

For Event 4, the failure information of the source connection includes at least one of the following:
  failure type indication information of Event 4; and
  measurement information.

The "failure type indication information of Event 4" is the same as that in Event 1.

The "measurement information" is the same as that in Event 1.

For Event 5, the failure information of the target connection includes at least one of the following:
  failure type indication information of Event 5; and
  measurement information.

The "failure type indication information of Event 5" includes any one of the following:

radio link failure;
integrity check failure;
RRC message reconfiguration failure; and
maximum uplink transmission timing difference exceeded (for example, a maximum uplink transmission timing difference between the source connection and the target connection of the UE exceeds a maximum timing difference, and the UE stops data transmission over the target connection).

The "measurement information" is the same as that in Event 1.

For Event 6, the failure information includes at least one of the following:
failure information of the source connection (same as Event 1);
failure information of the target connection (same as Event 5); and
information that both the source connection and the target connection fail.

The "information that both the source connection and the target connection fail" includes at least one of the following:
an indication indicating that both the source connection and the target connection fail;
an indication indicating failure types of both source connection failure and target connection failure; and
measurement information.

The "indication indicating failure types of both source connection failure and target connection failure" includes at least one of the following:
radio link failure;
integrity check failure;
RRC message reconfiguration failure; and
maximum uplink transmission timing difference exceeded (for example, a maximum uplink transmission timing difference between the source connection and the target connection of the UE exceeds a maximum timing difference, and the UE stops data transmission over the source connection and the target connection).

The "indication indicating failure types of both source connection failure and target connection failure" may be determined by the failure type of the source connection or the failure type of the target connection according to protocol prescription or a network side indication. For example, if the source connection experiences integrity check failure and the target connection experiences radio link failure, the UE may report the failure type (that is, handover failure) of the target connection according to protocol prescription.

The "measurement information" is the same as that in Event 1.

Additionally, the UE reports connection failure timing information.

Method 1: Different connection failure timing information is reported for different connections.

Method 2: One piece of connection failure timing information is reported when a plurality of connections fail.

For Method 1, the connection failure timing information of the source connection records a duration from a moment when a DAPS mobility management command is received or executed to a moment when the source connection fails. The connection failure timing information of the target connection records a duration from a moment when a DAPS mobility management command is received to a moment when the target connection fails.

For Method 2, the information records a duration from a moment when a DAPS mobility management command is received to a moment when the source (target) connection fails. Whether the source (or target) connection is used for timing is prescribed by a protocol or configured by a network.

In this embodiment of the present invention, for the DAPS mobility procedure, different failure events are differentiated, different connections are differentiated, and different connection failure types are differentiated and then reported to the network side. Therefore, in this embodiment of the present invention, the UE can report failure information and a failure type of a corresponding connection to the network side in a case of connection failure in the DAPS mobility procedure, thereby helping the network side to optimize connection configuration information for the DAPS mobility procedure.

Figure 3:
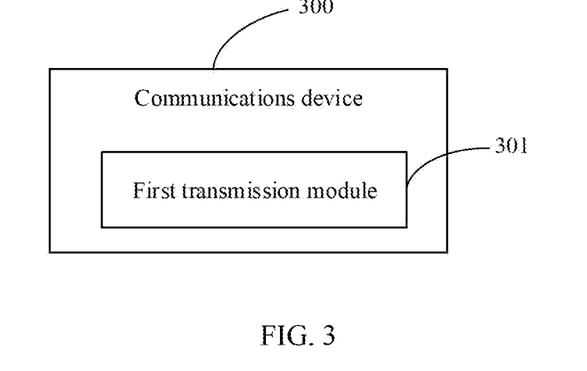
FIG. 3 is a first structural diagram of a communications device according to an embodiment of the present invention.

FIG. 3 is a first structural diagram of a communications device according to an embodiment of the present invention. As shown in FIG. 3, the communications device 300 includes:
a first transmission module, configured to: in a case that failure has occurred on first connection(s) in a dual active protocol stack DAPS mobility procedure, transmit failure information of at least one of the first connection(s), where
the first connection(s) include at least one of the following: a source connection between a terminal and a source cell and a target connection between the terminal and a target cell.

Optionally, in a case that the first connection(s) are the source connection or the target connection, the failure information satisfies any one of the following:
that the failure information includes first indication information for indicating a connection corresponding to the failure information; and
that the failure information is transmitted over a target resource, where the target resource is a resource corresponding to a second connection, and the second connection is a connection other than the connection corresponding to the failure information in the first connection(s).

Optionally, in a case that the first connection(s) include the source connection and the target connection and that a connection corresponding to the failure information is the source connection or the target connection, the communications device 300 further includes:
a second transmission module, configured to transmit second indication information for indicating that the terminal has experienced source connection failure and target connection failure.

Optionally, the connection corresponding to the failure information is prescribed by a protocol or configured by a network side device.

Optionally, the failure information includes third indication information for indicating any one of the following:
that a connection corresponding to the failure information fails before the terminal is connected to the target cell; and
that a connection corresponding to the failure information fails after the terminal is connected to the target cell.

Optionally, in a case that the first condition is satisfied, the failure information includes at least one of the following: fourth indication information for indicating a failure type of a connection corresponding to the failure information, and measurement information, where
that the first condition is satisfied includes any one of the following:
that the first connection is the source connection or the target connection; and that the first connection(s) include the source connection and the target connection and that a connection corresponding to the failure information is the source connection or the target connection.

Optionally, in a case that a second condition is satisfied, the failure type of the connection corresponding to the failure information includes any one of the following: radio link failure, integrity check failure, radio resource control RRC message reconfiguration failure, and maximum uplink transmission timing difference exceeded, where
that the second condition is satisfied includes any one of the following:
that the connection corresponding to the failure information is the source connection; and
that the connection corresponding to the failure information is the target connection and that the connection corresponding to the failure information fails after the terminal is connected to the target cell.

Optionally, in a case that the connection corresponding to the failure information is the target connection and that the connection corresponding to the failure information fails before the terminal is connected to the target cell, the failure type of the connection corresponding to the failure information includes any one of the following: handover failure, secondary cell group SCG addition failure, radio link failure, integrity check failure, RRC message reconfiguration failure, and maximum uplink transmission timing difference exceeded.

Optionally, in a case that the first connection(s) include the source connection and the target connection and that connections corresponding to the failure information include the source connection and the target connection, the failure information includes at least one of the following:
fifth indication information for indicating that the terminal has experienced source connection failure and target connection failure;
sixth indication information for indicating failure type(s) of at least one of the source connection and the target connection; and
measurement information.

Optionally, the sixth indication information satisfies any one of the following:
in a case that the sixth indication information is used to indicate the failure type of the source connection or the target connection, a connection corresponding to the sixth indication information is prescribed by a protocol or configured by a network side device; and
in a case that the sixth indication information is used to indicate the failure types of the source connection and the target connection, the sixth indication information is further used to indicate a connection corresponding to each failure type.

Optionally, the failure type(s) indicated by the sixth indication information satisfy at least one of the following:
in a case that the connection corresponding to the sixth indication information fails before the terminal is connected to the target cell, the failure type(s) indicated by the sixth indication information include at least one of the following: handover failure, SCG addition failure, radio link failure, integrity check failure, RRC message reconfiguration failure, and maximum uplink transmission timing difference exceeded; and
in a case that the connection corresponding to the sixth indication information fails after the terminal is connected to the target cell, the failure type(s) indicated by the sixth indication information include at least one of the following: radio link failure, integrity check failure, RRC message reconfiguration failure, and maximum uplink transmission timing difference exceeded.

Optionally, the measurement information includes at least one of the following: source cell measurement result, target cell measurement result, and neighboring cell measurement result, where
the source cell is a primary cell PCell or a secondary cell SCell, and the target cell is a PCell or a SCell.

Optionally, the communications device 300 further includes:
a third transmission module, configured to transmit failure timing duration(s) of at least one of the first connection (s) in a case that a third condition is satisfied, where a failure timing duration of each connection starts from a first time point to a time point when the connection fails, where
that the third condition is satisfied includes any one of the following:
that in a case that N connections of the terminal have failed, the terminal is allowed to report failure timing durations of M connections; and
that in a case that N connections of the terminal have failed, the terminal is allowed to report failure timing duration(s) of connection(s) of a target type in the M connections, and that the first connection(s) include connection(s) of the target type, where N is a positive integer, and M is a positive integer less than or equal to N.

Optionally, connection(s) corresponding to the transmitted failure timing duration(s) satisfy any one of the following:
that in a case that the third condition being satisfied includes the terminal being allowed to report failure timing durations of M connections, the connection(s) corresponding to the transmitted failure timing duration (s) include all of the first connection(s); and
that in a case that the third condition being satisfied includes the terminal being allowed to report failure timing duration(s) of connection(s) of a target type in the M connections and that the first connection(s) include connection(s) of the target type, the connection (s) corresponding to the transmitted failure timing duration(s) include the connection(s) of the target type in the first connection(s).

Optionally, the first time point is any one of the following:
a time point when the terminal receives a first command, where the first command instructs the terminal to perform a DAPS mobility procedure; and
a time point when the terminal starts to perform a DAPS mobility procedure.

Optionally, before the transmitting failure information of at least one of the first connection(s), the communications device 300 further includes:
a fourth transmission module, configured to transmit request information, where the request information is used to request the terminal to report the failure information.

Optionally, before the transmitting failure information of at least one of the first connection(s), the communications device 300 further includes:
a fifth transmission module, configured to transmit seventh indication information for indicating that the terminal has stored the failure information.

The communications device 300 can implement the processes implemented by the communications device in the method embodiment of the present invention, with the same beneficial effects achieved. To avoid repetition, details are not described herein again.

Figure 4:
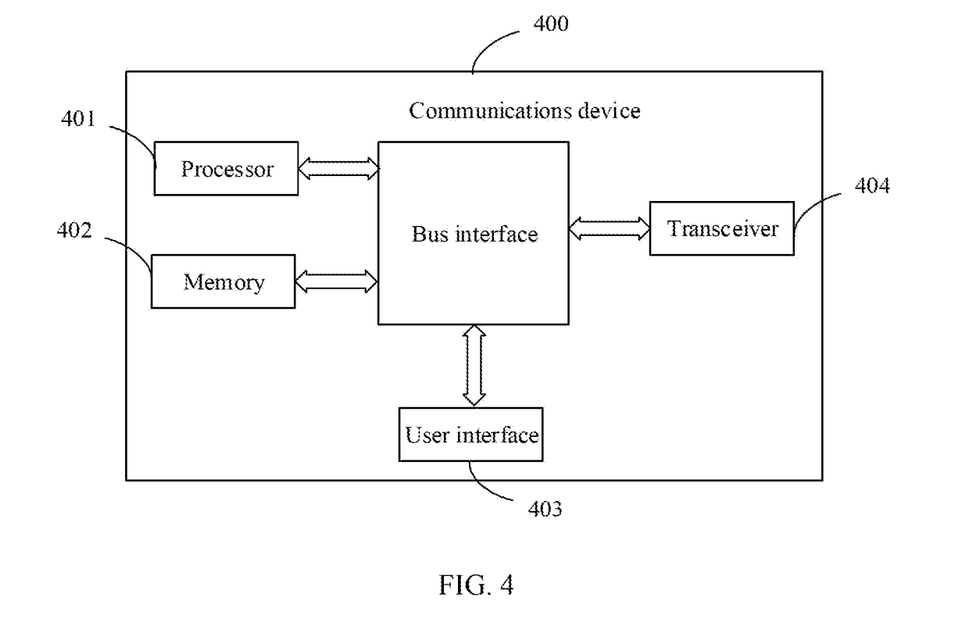
FIG. 4 is a second structural diagram of a communications device according to an embodiment of the present invention.

FIG. 4 is a second structural diagram of a network side device according to an embodiment of the present invention. As shown in FIG. 4, a communications device 400 includes a processor 401, a memory 402, a user interface 403, a transceiver 404, and a bus interface.

In this embodiment of the present invention, the communications device 400 further includes a computer program stored in the memory 402 and capable of running on the processor 401. When the computer program is executed by the processor 401, the following steps are implemented:

in a case that failure has occurred on first connection(s) in a dual active protocol stack DAPS mobility procedure, transmitting, by the transceiver 404, failure information of at least one of the first connection(s), where the first connection(s) include at least one of the following: a source connection between a terminal and a source cell and a target connection between the terminal and a target cell.

In FIG. 4, a bus architecture may include any quantity of interconnected buses and bridges, and specifically connect together various circuits of one or more processors represented by the processor 401 and a memory represented by the memory 402. The bus architecture may further interconnect various other circuits such as a peripheral device, a voltage regulator, and a power management circuit. These are all common sense in the art, and therefore are not further described in this specification. The bus interface provides an interface. The transceiver 404 may be a plurality of components, that is, the transceiver 404 includes a transmitter and a receiver, and provides a unit for communicating with various other apparatuses on a transmission medium. For different user equipment, the user interface 403 may also be an interface that can be externally or internally connected to a required device, and the connected device includes but is not limited to a keypad, a display, a speaker, a microphone, a joystick, and the like.

The processor 401 is responsible for bus architecture management and general processing. The memory 402 may store data that is used by the processor 2601 during operation.

Optionally, in a case that the first connection(s) are the source connection or the target connection, the failure information satisfies any one of the following:

that the failure information includes first indication information for indicating a connection corresponding to the failure information; and that the failure information is transmitted over a target resource, where the target resource is a resource corresponding to a second connection, and the second connection is a connection other than the connection corresponding to the failure information in the first connection(s).

Optionally, in a case that the first connection(s) include the source connection and the target connection and that a connection corresponding to the failure information is the source connection or the target connection, the method further includes:

transmitting, by the transceiver 404, second indication information for indicating that the terminal has experienced source connection failure and target connection failure.

Optionally, the connection corresponding to the failure information is prescribed by a protocol or configured by a network side device.

Optionally, the failure information includes third indication information for indicating any one of the following:

that a connection corresponding to the failure information fails before the terminal is connected to the target cell; and that a connection corresponding to the failure information fails after the terminal is connected to the target cell.

Optionally, in a case that the first condition is satisfied, the failure information includes at least one of the following: fourth indication information for indicating a failure type of a connection corresponding to the failure information, and measurement information, where that the first condition is satisfied includes any one of the following:

that the first connection is the source connection or the target connection; and that the first connection(s) include the source connection and the target connection and that a connection corresponding to the failure information is the source connection or the target connection.

Optionally, in a case that a second condition is satisfied, the failure type of the connection corresponding to the failure information includes any one of the following: radio link failure, integrity check failure, radio resource control RRC message reconfiguration failure, and maximum uplink transmission timing difference exceeded, where that the second condition is satisfied includes any one of the following:

that the connection corresponding to the failure information is the source connection; and that the connection corresponding to the failure information is the target connection and that the connection corresponding to the failure information fails after the terminal is connected to the target cell.

Optionally, in a case that the connection corresponding to the failure information is the target connection and that the connection corresponding to the failure information fails before the terminal is connected to the target cell, the failure type of the connection corresponding to the failure information includes any one of the following: handover failure, secondary cell group SCG addition failure, radio link failure, integrity check failure, RRC message reconfiguration failure, and maximum uplink transmission timing difference exceeded.

Optionally, in a case that the first connection(s) include the source connection and the target connection and that connections corresponding to the failure information include the source connection and the target connection, the failure information includes at least one of the following:

fifth indication information for indicating that the terminal has experienced source connection failure and target connection failure;

sixth indication information for indicating failure type(s) of at least one of the source connection and the target connection; and measurement information.

Optionally, the sixth indication information satisfies any one of the following:

in a case that the sixth indication information is used to indicate the failure type of the source connection or the target connection, a connection corresponding to the sixth indication information is prescribed by a protocol or configured by a network side device; and in a case that the sixth indication information is used to indicate the failure types of the source connection and the target connection, the sixth indication information is further used to indicate a connection corresponding to each failure type.

Optionally, the failure type(s) indicated by the sixth indication information satisfy at least one of the following:

in a case that the connection corresponding to the sixth indication information fails before the terminal is connected to the target cell, the failure type(s) indicated by the sixth indication information include at least one of the following: handover failure, SCG addition failure, radio link failure, integrity check failure, RRC message reconfiguration failure, and maximum uplink transmission timing difference exceeded; and in a case that the connection corresponding to the sixth indication information fails after the terminal is connected to the target cell, the failure type(s) indicated by the sixth indication information include at least one of the following: radio link failure, integrity check failure, RRC message reconfiguration failure, and maximum uplink transmission timing difference exceeded.

Optionally, the measurement information includes at least one of the following: source cell measurement result, target cell measurement result, and neighboring cell measurement result, where the source cell is a primary cell PCell or a secondary cell SCell, and the target cell is a PCell or a SCell.

Optionally, when the computer program is executed by the processor 401, the following steps may be further implemented:

transmitting, by the transceiver 404, failure timing duration(s) of at least one of the first connection(s) in a case that a third condition is satisfied, where a failure timing duration of each connection starts from a first time point to a time point when the connection fails, where that the third condition is satisfied includes any one of the following:

that in a case that N connections of the terminal have failed, the terminal is allowed to report failure timing durations of M of the N connections; and that in a case that N connections of the terminal have failed, the terminal is allowed to report failure timing duration(s) of connection(s) of a target type in the N connections, and that the first connection(s) include connection(s) of the target type, where N is a positive integer, and M is a positive integer less than or equal to N.

Optionally, connection(s) corresponding to the transmitted failure timing duration(s) satisfy any one of the following:

that in a case that the third condition being satisfied includes the terminal being allowed to report failure timing durations of M of the N connections, the connection(s) corresponding to the transmitted failure timing duration(s) include all of the first connection(s); and that in a case that the third condition being satisfied includes the terminal being allowed to report failure timing duration(s) of connection(s) of a target type in the N connections and that the first connection(s) include connection(s) of the target type, the connection(s) corresponding to the transmitted failure timing duration(s) include the connection(s) of the target type in the first connection(s).

Optionally, the first time point is any one of the following:

a time point when the terminal receives a first command, where the first command instructs the terminal to perform a DAPS mobility procedure; and a time point when the terminal starts to perform a DAPS mobility procedure.

Optionally, when the computer program is executed by the processor 401, the following steps may be further implemented:

transmitting, by the transceiver 404, request information, where the request information is used to request the terminal to report the failure information.

Optionally, when the computer program is executed by the processor 401, the following steps may be further implemented:

transmitting, by the transceiver 404, seventh indication information for indicating that the terminal has stored the failure information.

The communications device 400 can implement the processes implemented by the communications device in the foregoing method embodiments. To avoid repetition, details are not described herein again.

An embodiment of the present invention further provides a computer-readable storage medium, where the computer-readable storage medium stores a computer program. When the computer program is executed by a processor, the processes of the foregoing embodiments of the method for transmitting failure information are implemented, with the same technical effect achieved. To avoid repetition, details are not described herein again. For example, the computer-readable storage medium is a read-only memory (Read-Only Memory, ROM), a random access memory (Random Access Memory, RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a communications device (which may be a mobile phone, a computer, a server, an air conditioner, a network device, or the like) to perform the method described in the embodiments of the present invention.

The embodiments of the present invention are described above with reference to the accompanying drawings, but the present invention is not limited to the foregoing embodiments. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A method for transmitting failure information, applied to a communications device, wherein the method comprises:
    in a case that failure has occurred on first connection(s) in a dual active protocol stack DAPS mobility procedure, transmitting failure information of at least one of the first connection(s), and
    transmitting failure timing duration(s) of the at least one of the first connection(s), wherein a failure timing duration of each connection is a duration from a first time point to a time point when the connection fails, wherein
    the first connection(s) comprise at least one of the following: a source connection between a terminal and a source cell or a target connection between the terminal and a target cell, and
    the first time point is any one of the following:
        a time point when the terminal receives a first command, wherein the first command instructs the terminal to perform the DAPS mobility procedure; or
        a time point when the terminal starts to perform the DAPS mobility procedure.

2. The method according to claim 1, wherein in a case that the first connection(s) are the source connection or the target connection, the failure information satisfies any one of the following:
    that the failure information comprises first indication information for indicating a connection corresponding to the failure information; and
    that the failure information is transmitted over a target resource, wherein the target resource is a resource corresponding to a second connection, and the second connection is a connection other than the connection corresponding to the failure information in the first connection(s).

3. The method according to claim 1, wherein in a case that the first connection(s) comprise the source connection and the target connection and that a connection corresponding to the failure information is the source connection or the target connection, the method further comprises:
    transmitting second indication information for indicating that the terminal has experienced source connection failure and target connection failure.

4. The method according to claim 3, wherein the connection corresponding to the failure information is prescribed by a protocol or configured by a network side device.

5. The method according to claim 1, wherein the failure information comprises third indication information for indicating any one of the following:
    that a connection corresponding to the failure information fails before completion of random access to the target connection; and
    that a connection corresponding to the failure information fails after completion of random access to the target connection.

6. The method according to claim 1, wherein in a case that a first condition is satisfied, the failure information comprises at least one of the following: fourth indication information for indicating a failure type of a connection corresponding to the failure information, or measurement information, wherein
    that the first condition is satisfied comprises any one of the following:
        that the first connection is the source connection or the target connection; and
        that the first connection(s) comprise the source connection and the target connection and that a connection corresponding to the failure information is the source connection or the target connection.

7. The method according to claim 6, wherein in a case that a second condition is satisfied, the failure type of the connection corresponding to the failure information comprises any one of the following: radio link failure, integrity check failure, radio resource control RRC message reconfiguration failure, and maximum uplink transmission timing difference exceeded, wherein
    that the second condition is satisfied comprises any one of the following:
        that the connection corresponding to the failure information is the source connection; and
        that the connection corresponding to the failure information is the target connection and that the connection corresponding to the failure information fails after the terminal is connected to the target cell.

8. The method according to claim 6, wherein in a case that the connection corresponding to the failure information is the target connection and that the connection corresponding to the failure information fails before the terminal is connected to the target cell, the failure type of the connection corresponding to the failure information comprises any one of the following: handover failure, secondary cell group SCG addition failure, radio link failure, integrity check failure, RRC message reconfiguration failure, and maximum uplink transmission timing difference exceeded.

9. The method according to claim 6, wherein the measurement information comprises at least one of the following: source cell measurement result, target cell measurement result, or neighboring cell measurement result, wherein
    the source cell is a primary cell PCell or a secondary cell SCell, and the target cell is a PCell or a SCell.

10. The method according to claim 1, wherein in a case that the first connection(s) comprise the source connection and the target connection and that connections corresponding to the failure information comprise the source connection and the target connection, the failure information comprises at least one of the following:
    fifth indication information for indicating that the terminal has experienced source connection failure and target connection failure;
    sixth indication information for indicating failure type(s) of at least one of the source connection or the target connection; or
    measurement information.

11. The method according to claim 10, wherein the sixth indication information satisfies any one of the following:
    in a case that the sixth indication information is used to indicate the failure type of the source connection or the target connection, a connection corresponding to the sixth indication information is prescribed by a protocol or configured by a network side device; and
    in a case that the sixth indication information is used to indicate the failure types of the source connection and the target connection, the sixth indication information is further used to indicate a connection corresponding to each failure type.

12. The method according to claim 10, wherein the failure type(s) indicated by the sixth indication information satisfy at least one of the following:
    in a case that the connection corresponding to the sixth indication information fails before the terminal is connected to the target cell, the failure type(s) indicated by the sixth indication information comprise at least one of the following: handover failure, SCG addition failure, radio link failure, integrity check failure, RRC message reconfiguration failure, or maximum uplink transmission timing difference exceeded; or in a case that the connection corresponding to the sixth indication information fails after the terminal is connected to the target cell, the failure type(s) indicated by the sixth indication information comprise at least one of the following: radio link failure, integrity check failure, RRC message reconfiguration failure, or maximum uplink transmission timing difference exceeded.

13. The method according to claim 1, wherein transmitting the failure timing duration(s) of the at least one of the first connection(s) comprises:

transmitting the failure timing duration(s) of the at least one of the first connection(s) in response to a third condition being satisfied, wherein that the third condition is satisfied comprises any one of the following:

that N connections of the terminal have failed, the terminal is allowed to report failure timing durations of M of the N connections; or that N connections of the terminal have failed, the terminal is allowed to report failure timing duration(s) of connection(s) of a target type in the N connections, and that the first connection(s) comprise connection(s) of the target type, wherein N is a positive integer, and M is a positive integer less than or equal to N.

14. The method according to claim 13, wherein connection(s) corresponding to the transmitted failure timing duration(s) satisfy any one of the following:

that in a case that the third condition being satisfied comprises the terminal being allowed to report failure timing durations of M of the N connections, the connection(s) corresponding to the transmitted failure timing duration(s) comprise all of the first connection(s); and that in a case that the third condition being satisfied comprises the terminal being allowed to report failure timing duration(s) of connection(s) of a target type in the N connections and that the first connection(s) comprise connection(s) of the target type, the connection(s) corresponding to the transmitted failure timing duration(s) comprise the connection(s) of the target type in the first connection(s).

15. The method according to claim 1, wherein before the transmitting failure information of at least one of the first connection(s), the method further comprises:

transmitting request information, wherein the request information is used to request the terminal to report the failure information.

16. The method according to claim 1, wherein before the transmitting failure information of at least one of the first connection(s), the method further comprises:

transmitting seventh indication information for indicating that the terminal has stored the failure information.

17. A communications device, comprising: a processor, a memory, and a program stored in the memory and capable of running on the processor, wherein when the program is executed by the processor, the processor is configured to: in a case that failure has occurred on first connection(s) in a dual active protocol stack DAPS mobility procedure, transmit failure information of at least one of the first connection(s), and transmitting failure timing duration(s) of the at least one of the first connection(s), wherein a failure timing duration of each connection is a duration from a first time point to a time point when the connection fails, wherein the first connection(s) comprise at least one of the following: a source connection between a terminal and a source cell or a target connection between the terminal and a target cell, and the first time point is any one of the following:

a time point when the terminal receives a first command, wherein the first command instructs the terminal to perform the DAPS mobility procedure; or a time point when the terminal starts to perform the DAPS mobility procedure.

18. The communications device according to claim 17, wherein in a case that the first connection(s) are the source connection or the target connection, the failure information satisfies any one of the following:

that, the failure information comprises first indication information for indicating a connection corresponding to the failure information; and that the failure information is transmitted over a target resource, wherein the target resource is a resource corresponding to a second connection, and the second connection is a connection other than the connection corresponding to the failure information in the first connection(s).

19. A non-transitory computer-readable storage medium, wherein the computer-readable storage medium stores a computer program, and the computer program, when executed by a processor, causes the processor to:

in a case that failure has occurred on first connection(s) in a dual active protocol stack DAPS mobility procedure, transmitting failure information of at least one of the first connection(s), and transmit failure timing duration(s) of the at least one of the first connection(s), wherein a failure timing duration of each connection is a duration from a first time point to a time point when the connection fails, wherein the first connection(s) comprise at least one of the following: a source connection between a terminal and a source cell or a target connection between the terminal and a target cell, and the first time point is any one of the following:

a time point when the terminal receives a first command, wherein the first command instructs the terminal to perform the DAPS mobility procedure; or a time point when the terminal starts to perform the DAPS mobility procedure.

* * * * *